United States Patent
Sano et al.

(10) Patent No.: US 10,214,605 B2
(45) Date of Patent: Feb. 26, 2019

(54) METHOD FOR PRODUCING POLYCARBOXYLIC ACID POLYMER

(71) Applicant: Nippon Shokubai Co., Ltd., Osaka (JP)

(72) Inventors: Yuki Sano, Osaka (JP); Takahiro Tsumori, Osaka (JP); Akihiko Kanzaki, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 5 days.

(21) Appl. No.: 15/515,200

(22) PCT Filed: Sep. 18, 2015

(86) PCT No.: PCT/JP2015/076679
§ 371 (c)(1),
(2) Date: Mar. 29, 2017

(87) PCT Pub. No.: WO2016/052258
PCT Pub. Date: Apr. 7, 2016

(65) Prior Publication Data
US 2017/0218108 A1    Aug. 3, 2017

(30) Foreign Application Priority Data

Sep. 30, 2014 (JP) .................. 2014-199810
Sep. 17, 2015 (JP) .................. 2015-183520

(51) Int. Cl.
C08F 220/06 (2006.01)
C08F 20/00 (2006.01)
C08F 2/10 (2006.01)
C08F 220/08 (2006.01)

(52) U.S. Cl.
CPC ............ *C08F 220/06* (2013.01); *C08F 2/10* (2013.01); *C08F 20/00* (2013.01); *C08F 220/08* (2013.01)

(58) Field of Classification Search
CPC ........ C08F 220/06; C08F 220/08; C08F 2/10; C08F 20/00

USPC .......................................................... 526/194
See application file for complete search history.

(56) References Cited

U.S. PATENT DOCUMENTS

| 5,597,509 A |   | 1/1997 | Kirk |
| 5,661,206 A | * | 8/1997 | Tanaka ............... C04B 24/2647 524/376 |
| 6,844,410 B2 |   | 1/2005 | Michl et al. |

FOREIGN PATENT DOCUMENTS

| JP | 07-53249 A | 2/1995 |
| JP | 07-278206 A | 10/1995 |
| JP | 2002-338618 A | 11/2002 |
| JP | 2004-10895 A | 1/2004 |

OTHER PUBLICATIONS

International Search Report for PCT/JP2015/076679 dated Oct. 20, 2015.

* cited by examiner

*Primary Examiner* — Ling Siu Choi
*Assistant Examiner* — Ronald Grinsted
(74) *Attorney, Agent, or Firm* — Pearne & Gordon LLP

(57) ABSTRACT

Provided is a method of producing a polycarboxylic acid-based polymer, the method including adding a monomer composition containing an unsaturated monocarboxylic acid-based monomer and/or an unsaturated dicarboxylic acid-based monomer to a reaction vessel to perform a polymerization reaction, which enables effective suppression of the foaming of a polymerization reaction liquid. The method of producing a polycarboxylic acid-based polymer of the present invention is a method of producing a polycarboxylic acid-based polymer, the method including adding a monomer composition containing an unsaturated monocarboxylic acid-based monomer and/or an unsaturated dicarboxylic acid-based monomer to a reaction vessel to perform a polymerization reaction, the method further including adding a defoaming agent by a time when 100 mass % of a total amount of the monomer composition is added.

8 Claims, No Drawings

METHOD FOR PRODUCING POLYCARBOXYLIC ACID POLYMER

TECHNICAL FIELD

The present invention relates to a method of producing a polycarboxylic acid-based polymer.

BACKGROUND ART

The production of a polycarboxylic acid-based polymer through the polymerization of a monomer composition containing an unsaturated monocarboxylic acid-based monomer, such as (meth)acrylic acid (salt), or an unsaturated dicarboxylic acid-based monomer, such as maleic acid (salt), has been performed (see, for example, Patent Literatures 1 and 2).

In the production of such polycarboxylic acid-based polymer, the foaming of a polymerization reaction liquid may occur. Such foaming occurs in the production of, for example, a homopolymer of the unsaturated monocarboxylic acid-based monomer, a homopolymer of the unsaturated dicarboxylic acid-based monomer, a copolymer of the unsaturated monocarboxylic acid-based monomer and the unsaturated dicarboxylic acid-based monomer, a copolymer of the unsaturated monocarboxylic acid-based monomer and a sulfonic group-containing ether compound, such as sodium 3-allyloxy-2-hydroxy-1-propanesulfonate (hereinafter sometimes referred to as "HAPS"), or a copolymer of the unsaturated monocarboxylic acid-based monomer, the unsaturated dicarboxylic acid-based monomer, and the sulfonic group-containing ether compound. In particular, the foaming occurs remarkably in the production of, for example, the copolymer of the unsaturated monocarboxylic acid-based monomer, the unsaturated dicarboxylic acid-based monomer, and the sulfonic group-containing ether compound.

Such foaming of the polymerization reaction liquid as described above does not become a large problem when small-scale foaming occurs. However, when large-scale foaming occurs, a reaction vessel is filled with the foamed polymerization reaction liquid, and hence the original loading amount of the polymerization reaction liquid needs to be reduced as compared to a scheduled amount. Accordingly, a problem in that productivity reduces occurs.

CITATION LIST

Patent Literature

[PTL 1] JP 07-278206 A
[PTL 2] JP 2002-338618 A

SUMMARY OF INVENTION

Technical Problem

An object of the present invention is to provide a method of producing a polycarboxylic acid-based polymer, the method including adding a monomer composition containing an unsaturated monocarboxylic acid-based monomer and/or an unsaturated dicarboxylic acid-based monomer to a reaction vessel to perform a polymerization reaction, which enables effective suppression of the foaming of a polymerization reaction liquid.

Solution to Problem

A method of producing a polycarboxylic acid-based polymer according to one embodiment of the present invention is a method of producing a polycarboxylic acid-based polymer, the method including adding a monomer composition containing an unsaturated monocarboxylic acid-based monomer and/or an unsaturated dicarboxylic acid-based monomer to a reaction vessel to perform a polymerization reaction, the method further including adding a defoaming agent by a time when 100 mass % of a total amount of the monomer composition is added.

In a preferred embodiment, an addition amount of the defoaming agent is from 1 ppm to 10,000 ppm with respect to the total amount of the monomer composition.

In a preferred embodiment, a total amount of the defoaming agent is initially loaded into the reaction vessel.

In a preferred embodiment, the defoaming agent includes an oxyalkylene-based defoaming agent.

In a preferred embodiment, the polymerization reaction is performed by using hydrogen peroxide as a polymerization initiator.

Advantageous Effects of Invention

According to the present invention, there can be provided the method of producing a polycarboxylic acid-based polymer, the method including adding a monomer composition containing an unsaturated monocarboxylic acid-based monomer and/or an unsaturated dicarboxylic acid-based monomer to a reaction vessel to perform a polymerization reaction, which enables effective suppression of the foaming of a polymerization reaction liquid.

Description of Embodiments

<<<<Method of producing Polycarboxylic Acid-based Polymer>>>>

A method of producing a polycarboxylic acid-based polymer of the present invention is a method of producing a polycarboxylic acid-based polymer, the method including adding a monomer composition containing an unsaturated monocarboxylic acid-based monomer and/or an unsaturated dicarboxylic acid-based monomer to a reaction vessel to perform a polymerization reaction, the method further including adding a defoaming agent by a time when 100 mass % of a total amount of the monomer composition is added.

With regard to the addition of the defoaming agent, it is preferred that 20 mass % or more of the defoaming agent be added by the time when 100 mass % of the total amount of the monomer composition is added. It is more preferred that 50 mass % or more of the defoaming agent be added by the time when 100 mass % of the total amount of the monomer composition is added. It is still more preferred that 80 mass % or more of the defoaming agent be added by the time when 100 mass % of the total amount of the monomer composition is added. It is particularly preferred that the total amount of the defoaming agent be added by the time when 100 mass % of the total amount of the monomer composition is added.

When a specific amount of the defoaming agent is added at a specific timing as described above, there can be provided a method of producing a polycarboxylic acid-based polymer, the method including adding a monomer composition containing an unsaturated monocarboxylic acid-based monomer and/or an unsaturated dicarboxylic acid-based monomer to a reaction vessel to perform a polymerization reaction, which enables effective suppression of the foaming of a polymerization reaction liquid.

<<Monomer Composition>>

The monomer composition contains the unsaturated monocarboxylic acid-based monomer and/or the unsaturated dicarboxylic acid-based monomer. The number of kinds of the unsaturated monocarboxylic acid-based monomers may be only one, or may be two or more. The number of kinds of the unsaturated dicarboxylic acid-based monomers may be only one, or may be two or more.

When the term "(meth)acryl" is described in this description, the term means acryl and/or methacryl.

When the term "(meth)allyl" is described in this description, the term means allyl and/or methallyl.

When the term "(meth)acrylate" is described in this description, the term means acrylate and/or methacrylate.

When the term "acid (salt)" is described in this description, the term means an acid and/or a salt thereof.

The salt of the "acid (salt)" is represented by Z of a —COOZ group. Z represents a metal atom, an ammonium group (constituting an ammonium salt, i.e., $COONH_4$), or an organic amino group (constituting an organic amine salt). Examples of the metal atom include: alkali metals, such as a sodium atom and a potassium atom; alkaline earth metals, such as a calcium atom; and transition metals, such as an iron atom. Examples of the organic amine salt include primary to quaternary amine salts, such as a methylamine salt, a n-butylamine salt, a monoethanolamine salt, a dimethylamine salt, a diethanolamine salt, a morpholine salt, and a trimethylamine salt. In order to sufficiently express the effects of the present invention, Z preferably represents a sodium atom or a potassium atom out of those examples. When the simple term "salt" is described in this description, the description of Z of the —COOZ group in the "acid (salt)" is incorporated as it is.

Examples of the unsaturated monocarboxylic acid-based monomer include (meth)acrylic acid (salt), crotonic acid (salt), α-hydroxyacrylic acid (salt), and α-hydroxymethylacrylic acid (salt). The unsaturated monocarboxylic acid-based monomer is preferably (meth)acrylic acid (salt).

Examples of the unsaturated dicarboxylic acid-based monomer include itaconic acid (salt), fumaric acid (salt), maleic acid (salt), 2-methyleneglutaric acid (salt), a half ester of an unsaturated dicarboxylic acid and an alcohol having 1 to 22 carbon atoms, a half amide of an unsaturated dicarboxylic acid and an amine having 1 to 22 carbon atoms, and a half ester of an unsaturated dicarboxylic acid and a glycol having 2 to 4 carbon atoms. In addition, the monomers may each be an anhydride. The unsaturated dicarboxylic acid-based monomer is preferably maleic acid (salt).

The monomer composition may contain any other monomer except the unsaturated monocarboxylic acid-based monomer and the unsaturated dicarboxylic acid-based monomer. The number of kinds of such other monomers may be only one, or may be two or more.

Examples of the other monomer include: sulfonic group-containing monomers, such as 3-(meth)allyloxy-2-hydroxy-1-propanesulfonic acid, 2-(meth)acrylamido-2-methylpropanesulfonic acid, (meth)allylsulfonic acid, vinylsulfonic acid, styrenesulfonic acid, 2-sulfoethyl (meth) acrylate, 2-methyl-1,3-butadiene-1-sulfonic acid, 1-(meth)acrylamido-1-propanesulfonic acid, 2-(meth)acrylamido-2-propanesulfonic acid, 2-(meth)acrylamido-2-methyl-1-propanesulfonic acid, (meth)allyloxybenzenesulfonic acid, styrenesulfonic acid, vinylsulfonic acid, sulfoethyl (meth) acrylate, sulfopropyl (meth)acrylate, (meth)allylsulfonic acid, isoprenesulfonic acid, and salts thereof; polyalkylene glycol chain-containing monomers, such as a monomer obtained by adding an alkylene oxide to (meth)allyl alcohol or isoprenol, and a (meth)acrylic acid ester of an alkoxyalkylene glycol; N-vinyl monomers, such as N-vinylpyrrolidone, N-vinylformamide, N-vinylacetamide, N-vinyl-N-methylformamide, N-vinyl-N-methylacetamide, and N-vinyloxazolidone; amide-based monomers, such as (meth) acrylamide, N,N-dimethylacrylamide, and N-isopropylacrylamide; (meth)allyloxypropane-based compounds, such as 3-(meth)allyloxy-1,2-dihydroxypropane, 3-allyloxy-1,2-dihydroxypropane, and 3-allyloxy-1,2-dihydroxypropane, and compounds obtained by adding 1 mol to 200 mol of ethylene oxide to 1 mol of each of the compounds (e.g., 3-allyloxy-1,2-di(poly)oxyethylene ether propane); allyl ether-based monomers, such as (meth)allyl alcohol and a compound obtained by adding 1 mol to 100 mol of ethylene oxide to 1 mol of (meth)allyl alcohol; isoprene-based monomers, such as isoprenol and a compound obtained by adding 1 mol to 100 mol of ethylene oxide to 1 mol of isoprenol; monomers each obtained by adding an alcohol, such as methanol, ethanol, or butanol, to allyl glycidyl ether; (meth) allyl alcohol; isoprene-based monomers, such as isoprenol; (meth)acrylic acid alkyl ester-based monomers, such as methyl (meth)acrylate, ethyl (meth)acrylate, butyl (meth) acrylate, 2-ethylhexyl (meth)acrylate, and dodecyl (meth) acrylate; (meth)acrylic acid hydroxyalkyl-based monomers, such as hydroxymethyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, and 2-hydroxyhexyl (meth)acrylate; vinyl aryl monomers, such as styrene, indene, and vinylaniline, isobutylene, and vinyl acetate; vinyl aromatic-based amino group-containing monomers each having a heterocyclic aromatic hydrocarbon group and an amino group, such as vinylpyridine and vinylimidazole, and quaternized products and salts thereof; aminoalkyl (meth)acrylates, such as dimethylaminoethyl acrylate, dimethylaminoethyl methacrylate, dimethylaminopropyl acrylate, and aminoethyl methacrylate, and quaternized products and salts thereof; allylamines, such as diallylamine and diallyldimethylamine, and quaternized products and salts thereof; and monomers obtained by subjecting (i) epoxy rings of (meth)allyl glycidyl ether, isoprenyl glycidyl ether, and vinyl glycidyl ether to a reaction with (ii) amines, such as a dialkyl amine, e.g., dimethylamine, diethylamine, diisopropylamine, or di(n-butyl) amine, an alkanolamine, e.g., diethanolamine or diisopropanolamine, an aminocarboxylic acid, e.g., iminodiacetic acid or glycine, and a cyclic amine, e.g., morpholine or pyrrole, and quaternized products and salts thereof.

Of the other monomers, sulfonic acid-based monomers, such as 3-(meth)allyloxy-2-hydroxy-1-propanesulfonic acid, 2-(meth)acrylamido-2-methylpropanesulfonic acid, (meth)allylsulfonic acid, vinylsulfonic acid, styrenesulfonic acid, 2-sulfoethyl (meth) acrylate, and a conjugated diene sulfonic acid, e.g., 2-methyl-1,3-butadiene-1-sulfonic acid, and salts thereof are preferred, and 3-(meth)allyloxy-2-hydroxy-1-propanesulfonic acid (salt) is more preferred.

The kinds and contents of various monomers in the monomer composition may be appropriately selected in accordance with a target polycarboxylic acid-based polymer.

Typical examples of the polycarboxylic acid-based polymer include a homopolymer of an unsaturated monocarboxylic acid-based monomer, a homopolymer of an unsaturated dicarboxylic acid-based monomer, a copolymer of an unsaturated monocarboxylic acid-based monomer and an unsaturated dicarboxylic acid-based monomer, a copolymer of an unsaturated monocarboxylic acid-based monomer and a sulfonic group-containing compound, and a copolymer of an unsaturated monocarboxylic acid-based monomer, an unsaturated dicarboxylic acid-based monomer, and a sulfonic group-containing compound. A typical example of the unsaturated monocarboxylic acid-based monomer is (meth) acrylic acid (salt). A typical example of the unsaturated dicarboxylic acid-based monomer is maleic acid (salt). Typical examples of the sulfonic group-containing compound include vinylsulfonic acid and salts thereof, styrenesulfonic acid and salts thereof, (meth)allylsulfonic acid and salts thereof, 3-(meth)allyloxy-2-hydroxypropanesulfonic acid and salts thereof, 3-(meth)allyloxy-1-hydroxypropanesulfonic acid and salts thereof, 2-(meth)allyloxyethylenesulfonic acid and salts thereof, and 2-acrylamido-2-methylpropanesulfonic acid and salts thereof. Of those, 3-allyloxy-2-hydroxy-1-propanesulfonic acid and salts thereof and 2-acrylamido-2-methylpropanesulfonic acid and salts thereof (AMPS) are preferred, and sodium 3-allyloxy-2-hydroxy-1-propanesulfonate (HAPS) is most preferred.

As specific examples of the polycarboxylic acid-based polymer, poly(meth)acrylic acid (salt), polymaleic acid (salt), a (meth)acrylic acid (salt)/maleic acid (salt) copolymer, a (meth)acrylic acid (salt)/sulfonic group-containing compound, a maleic acid (salt)/sulfonic group-containing compound, and a (meth)acrylic acid (salt)/maleic acid (salt)/sulfonic group-containing compound are preferred, a (meth) acrylic acid (salt)/sulfonic group-containing compound and a (meth)acrylic acid (salt)/maleic acid (salt)/sulfonic group-containing compound are more preferred, and a (meth) acrylic acid (salt)/maleic acid (salt)/sulfonic group-containing compound is still more preferred.

When the polycarboxylic acid-based polymer is a copolymer of the unsaturated monocarboxylic acid-based monomer and the unsaturated dicarboxylic acid-based monomer, the compounding ratio "unsaturated monocarboxylic acid-based monomer/unsaturated dicarboxylic acid-based monomer" of the unsaturated monocarboxylic acid-based monomer to the unsaturated dicarboxylic acid-based monomer is preferably from 10/90 to 90/10, more preferably from 20/80 to 80/20, still more preferably from 30/70 to 70/30, particularly preferably from 40/60 to 60/40 in terms of a molar ratio.

When the polycarboxylic acid-based polymer is a copolymer of the unsaturated monocarboxylic acid-based monomer and the sulfonic group-containing compound, the compounding ratio "unsaturated monocarboxylic acid-based monomer/sulfonic group-containing compound" of the unsaturated monocarboxylic acid-based monomer to the sulfonic group-containing compound is preferably from 50/50 to 98/2, more preferably from 60/40 to 95/5, still more preferably from 70/30 to 90/10, particularly preferably from 80/20 to 90/10 in terms of a molar ratio.

When the polycarboxylic acid-based polymer is a copolymer of the unsaturated monocarboxylic acid-based monomer, the unsaturated dicarboxylic acid-based monomer, and the sulfonic group-containing compound, the compounding ratio "unsaturated monocarboxylic acid-based monomer/unsaturated dicarboxylic acid-based monomer/sulfonic group-containing compound" among the unsaturated monocarboxylic acid-based monomer, the unsaturated dicarboxylic acid-based monomer, and the sulfonic group-containing compound is preferably from 30/30/40 to 49/49/2, more preferably from 35/35/30 to 48/48/4, still more preferably from 40/40/20 to 47/47/6, particularly preferably from 42/42/16 to 46/46/8 in terms of a molar ratio.

<<Production Method>>

In the method of producing a polycarboxylic acid-based polymer of the present invention, the polymerization reaction is performed by adding the monomer composition containing the unsaturated monocarboxylic acid-based monomer and/or the unsaturated dicarboxylic acid-based monomer to the reaction vessel. The monomer composition is as described in the foregoing.

<Reaction Vessel>

Any appropriate reaction vessel may be adopted as the reaction vessel as long as the reaction vessel is a reaction vessel that can be generally used in the production of a polycarboxylic acid-based polymer. Examples of such reaction vessel include a reaction vessel made of a metal (e.g., SUS), a reaction vessel made of glass, and a reaction vessel made of a resin. A typical example of the reaction vessel is a reaction vessel made of a metal (e.g., SUS).

<Solvent>

A solvent to be used in a reaction liquid (polymerization reaction liquid) at the time of the polymerization reaction is preferably an aqueous solvent, more preferably water. An organic solvent may be appropriately added for improving the solubility of the monomer composition in the solvent to the extent that the polymerization is not adversely affected. Examples of the organic solvent to be added include: lower alcohols, such as methanol, ethanol, propanol, and butanol; amides, such as dimethylformaldehyde; and ethers, such as diethyl ether and dioxane.

<Defoaming Agent>

In the method of producing a polycarboxylic acid-based polymer of the present invention, the defoaming agent is added by the time when 100 mass % of the total amount of the monomer composition is added. When the defoaming agent is added by the time when 100 mass % of the total amount of the monomer composition is added, the foaming of the polymerization reaction liquid can be effectively suppressed.

In the method of producing a polycarboxylic acid-based polymer of the present invention, the defoaming agent is preferably added by the time when 90 mass % of the total amount of the monomer composition is added, the defoaming agent is more preferably added by the time when 70 mass % of the total amount of the monomer composition is added, the defoaming agent is still more preferably added by the time when 50 mass % of the total amount of the monomer composition is added, the defoaming agent is still further more preferably added by the time when 30 mass % of the total amount of the monomer composition is added, the defoaming agent is still even furthermore preferably added by the time when 10 mass % of the total amount of the monomer composition is added, the defoaming agent is particularly preferably added by the time when 5 mass % of the total amount of the monomer composition is added, and the defoaming agent is most preferably added before the monomer composition is added.

A preferred time when the defoaming agent is added is as described above, but in the method of producing a polycarboxylic acid-based polymer of the present invention, the defoaming agent may be added at the time when 100 mass % of the total amount of the monomer composition is added. When the defoaming agent is added at the time when 100 mass % of the total amount of the monomer composition is added, the total amount of the monomer composition has been added but an unreacted monomer composition remains, and hence the addition of the defoaming agent can effectively suppress the foaming of the polymerization reaction liquid.

When the defoaming agent is added by the time when 90 mass % of the total amount of the monomer composition is added, 20 mass % or more of the defoaming agent is preferably added by the time when 90 mass % of the total amount of the monomer composition is added, 50 mass % or more of the defoaming agent is more preferably added by the time when 90 mass % of the total amount of the monomer composition is added, 80 mass % or more of the defoaming agent is still more preferably added by the time when 90 mass % of the total amount of the monomer composition is added, and the total amount of the defoaming agent is particularly preferably added by the time when 90 mass % of the total amount of the monomer composition is added.

When the defoaming agent is added by the time when 80 mass % of the total amount of the monomer composition is added, 20 mass % or more of the defoaming agent is preferably added by the time when 80 mass % of the total amount of the monomer composition is added, 50 mass % or more of the defoaming agent is more preferably added by the time when 80 mass % of the total amount of the monomer composition is added, 80 mass % or more of the defoaming agent is still more preferably added by the time when 80 mass % of the total amount of the monomer composition is added, and the total amount of the defoaming agent is particularly preferably added by the time when 80 mass % of the total amount of the monomer composition is added.

When the defoaming agent is added by the time when 70 mass % of the total amount of the monomer composition is added, 20 mass % or more of the defoaming agent is preferably added by the time when 70 mass % of the total amount of the monomer composition is added, 50 mass % or more of the defoaming agent is more preferably added by the time when 70 mass % of the total amount of the monomer composition is added, 80 mass % or more of the defoaming agent is still more preferably added by the time when 70 mass % of the total amount of the monomer composition is added, and the total amount of the defoaming agent is particularly preferably added by the time when 70 mass % of the total amount of the monomer composition is added.

When the defoaming agent is added by the time when 50 mass % of the total amount of the monomer composition is added, 20 mass % or more of the defoaming agent is preferably added by the time when 50 mass % of the total amount of the monomer composition is added, 50 mass % or more of the defoaming agent is more preferably added by the time when 50 mass % of the total amount of the monomer composition is added, 80 mass % or more of the defoaming agent is still more preferably added by the time when 50 mass % of the total amount of the monomer composition is added, and the total amount of the defoaming agent is particularly preferably added by the time when 50 mass % of the total amount of the monomer composition is added.

When the defoaming agent is added by the time when 30 mass % of the total amount of the monomer composition is added, 20 mass % or more of the defoaming agent is preferably added by the time when 30 mass % of the total amount of the monomer composition is added, 50 mass % or more of the defoaming agent is more preferably added by the time when 30 mass % of the total amount of the monomer composition is added, 80 mass % or more of the defoaming agent is still more preferably added by the time when 30 mass % of the total amount of the monomer composition is added, and the total amount of the defoaming agent is particularly preferably added by the time when 30 mass % of the total amount of the monomer composition is added.

When the defoaming agent is added by the time when 20 mass % of the total amount of the monomer composition is added, 20 mass % or more of the defoaming agent is preferably added by the time when 20 mass % of the total amount of the monomer composition is added, 50 mass % or more of the defoaming agent is more preferably added by the time when 20 mass % of the total amount of the monomer composition is added, 80 mass % or more of the defoaming agent is still more preferably added by the time when 20 mass % of the total amount of the monomer composition is added, and the total amount of the defoaming agent is particularly preferably added by the time when 20 mass % of the total amount of the monomer composition is added.

When the defoaming agent is added by the time when 10 mass % of the total amount of the monomer composition is added, 20 mass % or more of the defoaming agent is preferably added by the time when 10 mass % of the total amount of the monomer composition is added, 50 mass % or more of the defoaming agent is more preferably added by the time when 10 mass % of the total amount of the monomer composition is added, 80 mass % or more of the defoaming agent is still more preferably added by the time when 10 mass % of the total amount of the monomer composition is added, and the total amount of the defoaming agent is particularly preferably added by the time when 10 mass % of the total amount of the monomer composition is added.

When the defoaming agent is added by the time when 5 mass % of the total amount of the monomer composition is added, 20 mass % or more of the defoaming agent is preferably added by the time when 5 mass % of the total amount of the monomer composition is added, 50 mass % or more of the defoaming agent is more preferably added by the time when 5 mass % of the total amount of the monomer composition is added, 80 mass % or more of the defoaming agent is still more preferably added by the time when 5 mass % of the total amount of the monomer composition is added, and the total amount of the defoaming agent is particularly preferably added by the time when 5 mass % of the total amount of the monomer composition is added.

When the defoaming agent is added before the monomer composition is added, 20 mass % or more of the defoaming agent is preferably added by the time of the initiation of the addition of the monomer composition, 50 mass % or more of the defoaming agent is more preferably added by the time of the initiation of the addition of the monomer composition, 80 mass % or more of the defoaming agent is still more preferably added by the time of the initiation of the addition of the monomer composition, and the total amount of the defoaming agent is particularly preferably added by the time of the initiation of the addition of the monomer composition (initial loading).

The addition amount of the defoaming agent is preferably from 1 ppm to 10,000 ppm, more preferably from 2 ppm to 5,000 ppm, still more preferably from 5 ppm to 2,000 ppm, particularly preferably from 10 ppm to 1,000 ppm, most preferably from 20 ppm to 200 ppm with respect to the total amount of the monomer composition. When the addition amount of the defoaming agent falls within the range, the foaming of the polymerization reaction liquid can be more effectively suppressed.

Any appropriate defoaming agent may be adopted as the defoaming agent to the extent that the effects of the present invention are not impaired. Examples of such defoaming agent include: mineral oil-based defoaming agents, such as kerosene and liquid paraffin; oil and fat-based defoaming agents, such as animal or vegetable oils, sesame oil, castor oil, and alkylene oxide adducts thereof; fatty acid-based defoaming agents, such as oleic acid, stearic acid, and alkylene oxide adducts thereof; fatty acid ester-based defoaming agents, such as diethylene glycol laurate, glycerin monoricinoleate, alkenyl succinic acid derivatives, sorbitol monolaurate, sorbitol trioleate, polyoxyethylene monolaurate, polyoxyethylene sorbitol monolaurate, and natural waxes; alcohol-based defoaming agents, such as octyl alcohol, hexadecyl alcohol, acetylene alcohol, glycols, and polyoxyalkylene glycols; amide-based defoaming agents, such as polyoxyalkylene amide and acrylate polyamine; phosphoric acid ester-based defoaming agents, such as tributyl phosphate and sodium octyl phosphate; metal soap-based defoaming agents, such as aluminum stearate and calcium oleate; silicone-based defoaming agents, such as silicone oil, silicone paste, silicone emulsion, organically modified polysiloxanes, and fluorosilicone oil; and oxyalkylene-based defoaming agents, such as polyoxyethylene polyoxypropylene adduct. Of those, an oxyalkylene-based defoaming agent is preferred from the viewpoint that the effects of the present invention can be further expressed.

The oxyalkylene-based defoaming agent is preferably an oxyalkylene-based defoaming agent represented by $R^{13}$(-T-$(R^{14}O)_q R^{15})_r$. Here, $R^{13}$ and $R^{15}$ each independently represent a hydrogen atom, an alkyl group having 1 to 22 carbon atoms, an alkenyl group having 1 to 22 carbon atoms, an aryl group, or an aralkyl group (the number of carbon atoms of an alkylene moiety in the aralkyl group is from 1 to 22), $R^{14}O$ represents one kind of oxyalkylene group having 2 to 4 carbon atoms, or a mixture of two or more kinds of such groups, and in the case of a mixture of two or more kinds of such groups, the groups may be added in a block manner, or may be added in a random manner, q represents an average addition number of moles of the oxyalkylene groups, and represents a number of from 0 to 300, and when q represents 0, $R^{13}$ and $R^{15}$ do not simultaneously represent hydrogen atoms, T represents —O—, —$CO_2$—, —$SO_4$—, —$PO_4$—, or —NH—, and r represents a number of 1 or 2, and when $R^{13}$ represents a hydrogen atom, r represents 1.

Examples of the oxyalkylene-based defoaming agent include: polyoxyalkylenes, such as (poly)oxyethylene (poly)oxypropylene adducts; (poly)oxyalkyl ethers, such as diethylene glycol butyl ether, polyoxyethylene oleyl ether, polyoxypropylene butyl ether, polyoxyethylene polyoxypropylene 2-ethyl hexyl ether, and oxyethylene oxypropylene adducts of higher alcohols each having 12 to 14 carbon atoms; (poly)oxyalkylene (alkyl)aryl ethers, such as polyoxypropylene phenyl ether, polyoxyethylene nonyl phenyl ether, and polyoxyethylene nonyl xylyl ether; acetylene ethers each produced by subjecting an acetylene alcohol, such as 2,4,7,9-tetramethyl-5-decyne-4,7-diol, 2,5-dimethyl-3-hexyne-2,5-diol, or 3-methyl-1-butyn-3-ol, to addition polymerization with an alkylene oxide; (poly) oxyalkylene fatty acid esters, such as diethylene glycol oleate and ethylene glycol distearate; (poly)oxyalkylene sorbitan fatty acid esters, such as polyoxyethylene sorbitan monolaurate and polyoxyethylene sorbitan trioleate; (poly)oxyalkylene alkyl(aryl) ether sulfuric acid ester salts, such as sodium polyoxypropylene methyl ether sulfate and sodium polyoxyethylene dodecyl phenol ether sulfate; (poly)oxyalkylene alkyl phosphoric acid esters, such as (poly)oxyethylene stearyl phosphate; and (poly)oxyalkylene alkyl amines, such as polyoxyethylene laurylamine. The number of kinds of the oxyalkylene-based defoaming agents may be only one, or may be two or more.

<Polymerization Reaction>

In the method of producing a polycarboxylic acid-based polymer of the present invention, part or the entirety of the monomer composition may be added (initially loaded) to the reaction vessel before the initiation of the polymerization. In particular, the total usage amount of the unsaturated dicarboxylic acid-based monomer is suitably added to the reaction vessel before the initiation of the polymerization from the viewpoint that the amount of a remaining monomer is further reduced. In addition, part or the entirety of the unsaturated monocarboxylic acid-based monomer is preferably added to the reaction vessel after the initiation of the polymerization. When part or the entirety of the unsaturated monocarboxylic acid-based monomer is added after the initiation of the polymerization, the molecular weight distribution of the polymer to be obtained can be further narrowed.

Each of the various monomers in the monomer composition may be added alone, may be added after having been dissolved in a solvent, such as water, or may be added after having been mixed with any other raw material or the like.

In this description, the phrase "before the initiation of the polymerization" means a time before the time of the initiation of the polymerization, and the phrase "after the initiation of the polymerization" means a time after the time of the initiation of the polymerization. The phrase "time of the initiation of the polymerization" preferably means a time when part or the entirety of a polymerization initiator, and part or the entirety of the monomer composition are added to the reaction vessel.

Examples of the polymerization initiator include: hydrogen peroxide; persulfates, such as sodium persulfate, potassium persulfate, and ammonium persulfate; azo-based compounds, such as 2,2'-azobis(2-amidinopropane) dihydrochloride, 4,4'-azobis-4-cyanovaleric acid, azobisisobutyronitrile, and 2,2'-azobis(4-methoxy-2,4-dimethylvaleronitrile); and organic peroxides, such as benzoyl peroxide, lauroyl peroxide, peracetic acid, di-t-butyl peroxide, and cumene hydroperoxide. In addition, one kind of those polymerization initiators may be used alone, two or more kinds thereof may be used in combination. Of those polymerization initiators, hydrogen peroxide is preferably used, and hydrogen peroxide and a persulfate are more preferably used in combination. In addition, in some cases, a chain transfer agent or a polyvalent metal ion may be used (in this case, the polyvalent metal ion serves as a decomposition accelerator for the polymerization initiator), and both the agent and the ion may be simultaneously used.

The number of kinds of the persulfates may be only one, or may be two or more.

Examples of the persulfate include sodium persulfate, potassium persulfate, and ammonium persulfate.

The addition amount of the persulfate is preferably from 0.5 g to 6.0 g in terms of the compounding amount of the persulfate with respect to 1 mol of the monomer composition to be used.

The addition amount of hydrogen peroxide is preferably from 0.5 g to 40 g in terms of the compounding amount of hydrogen peroxide with respect to 1 mol of the monomer composition to be used.

When hydrogen peroxide and the persulfate are used in combination, an addition ratio between hydrogen peroxide and the persulfate is preferably as follows: the persulfate is added at a mass ratio of from 0.1 to 5.0 with respect to 1 of hydrogen peroxide. When the mass ratio of the persulfate is less than 0.1 with respect to 1 of hydrogen peroxide, the weight-average molecular weight of the polycarboxylic acid-based polymer to be obtained may be excessively high. Meanwhile, when the mass ratio of the persulfate is more than 5.0 with respect to 1 of hydrogen peroxide, a state in which a molecular weight-reducing effect by the addition of the persulfate is not obtained commensurately with the addition is established, and hence the persulfate may be wastefully consumed in a polymerization reaction system.

With regard to a method of adding hydrogen peroxide, the amount in which hydrogen peroxide is dropped in a substantially continuous manner out of the total usage amount thereof is preferably 85 mass % or more of a required predetermined amount, and is more preferably 90 mass % or more of the required predetermined amount, and the total amount thereof is particularly preferably dropped. Although hydrogen peroxide is continuously dropped, its dropping rate may be changed.

Under conditions at a polymerization temperature and a pH at the time of the polymerization, 10% or less of the required predetermined amount of hydrogen peroxide is preferably dropped, 7% or less thereof is more preferably dropped, 5% or less thereof is still more preferably dropped, and 3% or less thereof is particularly preferably dropped by the time of the initiation of the dropping of the monomer composition, and the dropping is most preferably initiated after (including "simultaneously with") the time of the initiation of the dropping of the monomer composition. When such dropping of hydrogen peroxide is performed, its effect as a polymerization initiator can be expressed to a larger extent.

With regard to the time of the completion of the dropping of hydrogen peroxide, under the conditions at the polymerization temperature and the pH at the time of the polymerization, the dropping is preferably completed before (including "simultaneously with") the time of the completion of the dropping of the monomer composition. When such dropping of hydrogen peroxide is performed, its effect as a polymerization initiator can be expressed to a larger extent.

With regard to a method of adding the persulfate, the amount in which the persulfate is dropped in a substantially continuous manner out of the total usage amount thereof is preferably 50 mass % or more of a required predetermined amount, and is more preferably 80 mass % or more of the required predetermined amount, and the total amount thereof is still more preferably dropped. Although the persulfate is continuously dropped, its dropping rate may be changed.

Under the conditions at the polymerization temperature and the pH at the time of the polymerization, the dropping of the persulfate is preferably continued even after the time of the completion of the dropping of the monomer composition (the dropping may be completed simultaneously with the completion of the dropping of the monomer composition). When such dropping of the persulfate is performed, its effect as a polymerization initiator can be expressed to a larger extent.

A chain transfer agent serving as a molecular weight modifier for the polymer may be used in combination with the polymerization initiator as required to the extent that the polymerization is not adversely affected. Examples of the chain transfer agent include a sulfite, a pyrosulfite, a bisulfite, a hypophosphite, mercaptopropionic acid, and thioglycolic acid. Of those, a bisulfite is preferred.

The number of kinds of the bisulfites may be only one, or may be two or more.

Examples of the bisulfite include sodium bisulfite, potassium bisulfite, and ammonium bisulfite.

The addition amount of the bisulfite is preferably from 0.1 g to 10 g in terms of the compounding amount of the bisulfite with respect to 1 mol of the monomer composition to be used.

When the persulfate and the bisulfite are used in combination, an addition ratio between the persulfate and the bisulfite is preferably as follows: the bisulfite is added at a mass ratio of from 0.5 to 10 with respect to 1 of the persulfate. When the mass ratio of the bisulfite is less than 0.5 with respect to 1 of the persulfate, an effect by the bisulfite may not be sufficient, and the weight-average molecular weight of the polycarboxylic acid-based polymer to be obtained may be excessively high. When the mass ratio of the bisulfite is more than 10 with respect to 1 of the persulfate, the effect by the bisulfite may not be obtained commensurately with its addition ratio. However, the compounding amounts of the persulfate and the bisulfite are not limited to the range, and specific compounding amounts of the persulfate and the bisulfite may be determined in accordance with their use applications and use environments. In, for example, the case where the polycarboxylic acid-based polymer is used as a water treatment agent, when its weight-average molecular weight is excessively high, its performance may reduce. Therefore, it is desirable that the compounding amounts be determined while attention is paid so that the weight-average molecular weight may not increase more than necessary.

Any appropriate temperature may be adopted as the polymerization temperature. Such polymerization temperature is preferably from 25° C. to the boiling point of the polymerization reaction liquid, more preferably from 50° C. to the boiling point, still more preferably from 60° C. to the boiling point, particularly preferably from 70° C. to the boiling point. When the polymerization temperature is less than 25° C., the weight-average molecular weight of the polymer to be obtained may excessively increase, or the amount of impurities to be produced may increase. In addition, a polymerization time lengthens and hence the productivity of the polymer may reduce. The term "polymerization temperature" refers to the temperature of the polymerization reaction liquid. Any appropriate method or apparatus may be used as a method of measuring, or means for controlling, the polymerization temperature. In addition, in general, the boiling point may exceed 100° C. depending on a monomer component (kind) and its amount.

Any appropriate pressure may be adopted as a polymerization pressure to the extent that the effects of the present invention are not impaired. Such polymerization pressure may be any one of, for example, the following pressures: under normal pressure, under reduced pressure, and under increased pressure.

The polymerization reaction liquid may contain one or more kinds of heavy metal ions. The term "heavy metal" means a metal having a specific gravity of 4 $g/cm^3$ or more. Specific examples of the heavy metal include iron, cobalt, manganese, chromium, molybdenum, tungsten, copper, silver, gold, lead, platinum, iridium, osmium, palladium, rhodium, and ruthenium. The polymerization reaction liquid preferably contains an ion of any such metal. The polymerization reaction liquid more preferably contains an iron ion. The ionic valence of the heavy metal ion is not particularly limited. For example, when iron is used as the heavy metal, an iron ion dissolved in the polymerization reaction liquid may be $Fe^{2+}$, may be $Fe^{3+}$, or may be a combination of the ions.

The heavy metal ion may be added by using a solution obtained by dissolving a heavy metal compound. The heavy metal compound to be used at that time is determined in accordance with a heavy metal ion that is desired to be incorporated into the polymerization reaction liquid. When water is used as the solvent, a water-soluble heavy metal salt is preferred. Examples of the water-soluble heavy metal salt include Mohr's salt ($Fe(NH_4)_2(SO_4)_2 \cdot 6H_2O$), ferrous sulfate heptahydrate, ferrous chloride, ferric chloride, and manganese chloride.

When the polymerization is performed under an acidic condition, the degree of neutralization of the polycarboxylic acid-based polymer to be obtained may be controlled to a neutral region (preferably a pH of from 2 to 7) by adding an alkali component after the completion of the polymerization. Examples of the alkali component include: alkali metal hydroxides, such as sodium hydroxide and potassium hydroxide; alkaline earth metal hydroxides, such as calcium hydroxide and magnesium hydroxide; and organic amines, such as ammonia, monoethanolamine, diethanolamine, and triethanolamine. The number of kinds of the alkali components may be only one, or may be two or more.

The polycarboxylic acid-based polymer can be produced by the foregoing reaction preferably in the form of an aqueous solution.

The polycarboxylic acid-based polymer thus obtained can be, for example, a polymer excellent in scale-preventing ability (scale-suppressing ability), and specifically, the polymer is particularly suitable for applications such as a water treatment agent and a dispersant.

The weight-average molecular weight of the polycarboxylic acid-based polymer to be obtained is preferably from 1,000 to 1,000,000, more preferably from 3,000 to 500,000. When the weight-average molecular weight falls within the range, the polycarboxylic acid-based polymer can exhibit various kinds of performance, such as a dispersing ability, a chelating ability, and an anti-gelling property, most effectively.

EXAMPLES

Now, the present invention is specifically described by way of Examples. However, the present invention is by no means limited to these Examples. The terms "part(s)" and "%" in Examples are by mass unless otherwise stated.

<Evaluation of Foaming of Polymerization Reaction Liquid>

Polymerization was performed in a cylindrical glass separable flask having an inner diameter of 8.5 cm and a height of 20 cm, the flask including four paddle blades (each having an inclination angle of 45°, and each measuring 5 cm in blade diameter by 2 cm in height) placed at a height of 5 mm from its bottom, at a stirring revolution number of 300 rpm, and the maximum foam height achieved by foaming was measured. The height of the highest site on the wall surface of the flask where foam reached when the foaming was most vigorous during the polymerization was measured as the maximum foam height.

◯: The maximum foam height is less than 1 cm.
x: The maximum foam height is 1 cm or more.

Example 1

274.0 g of pure water and 0.08 g of PLURONIC L-64 (manufactured by ADEKA Corporation) were initially loaded into a cylindrical glass separable flask having an inner diameter of 8.5 cm and a height of 20 cm, the flask including a temperature gauge, a stirrer, and a reflux condenser, and the temperature of the pure water was increased under stirring so that the pure water was brought into a boiling point reflux state.

Next, under stirring, while the reflux state was maintained, 293.0 g of 37% sodium acrylate (hereinafter abbreviated as "37% SA") and 14.8 g of an 80% aqueous solution of acrylic acid (hereinafter abbreviated as "80% AA") were dropped over 120 minutes from the initiation of polymerization, 4.7 g of 35% $H_2O_2$ was dropped over 120 minutes from the initiation of the polymerization, 179.4 g of 40% sodium 3-allyloxy-2-hydroxy-1-propanesulfonate (hereinafter abbreviated as "40% HAPS") was dropped over 120 minutes from the initiation of the polymerization, and 34.0 g of a 15% aqueous solution of sodium persulfate (hereinafter abbreviated as "15% NaPS") was dropped over 140 minutes from the initiation of the polymerization; the materials were dropped from dropping nozzles different from one another continuously at uniform rates. Further, the polymerization was finished by maintaining the boiling point reflux state over 20 minutes after the completion of the dropping of all the materials. Thus, a polycarboxylic acid-based polymer (1) was obtained.

The result is shown in Table 1.

Example 2

170.9 g of pure water, 141.8 g of a 48% aqueous solution of sodium hydroxide (hereinafter abbreviated as "48% NaOH"), 106.9 g of maleic anhydride, 113.0 g of 40% HAPS, and 0.04 g of PLURONIC L-64 (manufactured by ADEKA Corporation) were initially loaded into a cylindrical glass separable flask having an inner diameter of 8.5 cm and a height of 20 cm, the flask including a temperature gauge, a stirrer, and a reflux condenser, and the temperature of the pure water was increased under stirring so that the pure water was brought into a boiling point reflux state.

Next, under stirring, while the reflux state was maintained, 98.2 g of 80% AA was dropped over 120 minutes from the initiation of polymerization, 22.2 g of 35% $H_2O_2$ was dropped over 50 minutes from the initiation of the polymerization, 113.0 g of 40% HAPS was dropped over 50 minutes from the initiation of the polymerization, 20.8 g of 15% NaPS was dropped over 80 minutes from a time 50 minutes after the initiation of the polymerization to a time 130 minutes thereafter, and 13.3 g of pure water was dropped over 80 minutes from the time 50 minutes after the initiation of the polymerization to the time 130 minutes thereafter; the materials were dropped from dropping nozzles different from one another continuously at uniform rates. Further, the polymerization was finished by maintaining the boiling point reflux state over 20 minutes after the completion of the dropping of all the materials. Thus, a polycarboxylic acid-based polymer (2) was obtained.

The result is shown in Table 1.

Example 3

145.3 g of 48% NaOH, 106.9 g of maleic anhydride, 113.2 g of 40% HAPS, and 0.04 g of PLURONIC L-64 (manufactured by ADEKA Corporation) were initially loaded into a cylindrical glass separable flask having an inner diameter of 8.5 cm and a height of 20 cm, the flask including a temperature gauge, a stirrer, and a reflux condenser, and the temperature of the pure water was increased under stirring so that the pure water was brought into a boiling point reflux state.

Next, under stirring, while the reflux state was maintained, 98.1 g of 80% AA was dropped over 120 minutes from the initiation of polymerization, 113.2 g of 40% HAPS was dropped over 50 minutes from the initiation of the polymerization, and 129.8 g of 10% 2,2'-azobis(2-amidinopropane) hydrochloride (hereinafter abbreviated as "10% V-50") was dropped over 130 minutes from the initiation of the polymerization; the materials were dropped from dropping nozzles different from one another continuously at uniform rates. Further, the polymerization was finished by maintaining the boiling point reflux state over 20 minutes after the completion of the dropping of all the materials. Thus, a polycarboxylic acid-based polymer (3) was obtained.

The result is shown in Table 1.

Example 4

130.0 g of pure water, 167.7 g of 48% NaOH, 136.5 g of maleic anhydride, 132.0 g of 40% HAPS, and 0.04 g of PLURONIC F-68 (manufactured by ADEKA Corporation) were initially loaded into a cylindrical glass separable flask having an inner diameter of 8.5 cm and a height of 20 cm, the flask including a temperature gauge, a stirrer, and a reflux condenser, and the temperature of the pure water was increased under stirring so that the pure water was brought into a boiling point reflux state.

Next, under stirring, while the reflux state was maintained, 125.3 g of 80% AA was dropped over 120 minutes from the initiation of polymerization, 13.0 g of 35% $H_2O_2$ was dropped over 75 minutes from the initiation of the polymerization, 30.3 g of 15% NaPS was dropped over 130 minutes from the initiation of the polymerization, and 65.4 g of pure water was dropped over 55 minutes from a time 75 minutes after the initiation of the polymerization to a time 130 minutes thereafter; the materials were dropped from dropping nozzles different from one another continuously at uniform rates. Further, the polymerization was finished by maintaining the boiling point reflux state over 20 minutes after the completion of the dropping of all the materials. Thus, a polycarboxylic acid-based polymer (4) was obtained.

The result is shown in Table 1.

Example 5

125.1 g of pure water, 161.4 g of 48% NaOH, 128.5 g of maleic anhydride, 158.9 g of 40% HAPS, and 0.04 g of NEWCOL 3240 (manufactured by Nippon Nyukazai Co., Ltd.) were initially loaded into a cylindrical glass separable flask having an inner diameter of 8.5 cm and a height of 20 cm, the flask including a temperature gauge, a stirrer, and a reflux condenser, and the temperature of the pure water was increased under stirring so that the pure water was brought into a boiling point reflux state.

Next, under stirring, while the reflux state was maintained, 118.1 g of 80% AA was dropped over 120 minutes from the initiation of polymerization, 16.6 g of 35% $H_2O_2$ was dropped over 75 minutes from the initiation of the polymerization, 46.6 g of 15% NaPS was dropped over 130 minutes from the initiation of the polymerization, and 44.8 g of pure water was dropped over 55 minutes from a time 75 minutes after the initiation of the polymerization to a time 130 minutes thereafter; the materials were dropped from dropping nozzles different from one another continuously at uniform rates. Further, the polymerization was finished by maintaining the boiling point reflux state over 20 minutes after the completion of the dropping of all the materials. Thus, a polycarboxylic acid-based polymer (5) was obtained.

The result is shown in Table 1.

Example 6

A polycarboxylic acid-based polymer (6) was obtained in the same manner as in Example 5 except that in Example 5, NOPCO 8034 (manufactured by San Nopco Limited) was used instead of NEWCOL 3240.

The result is shown in Table 1.

Example 7

A polycarboxylic acid-based polymer (7) was obtained in the same manner as in Example 5 except that in Example 5, SN-DEFOAMER 313 (manufactured by San Nopco Limited) was used instead of NEWCOL 3240.

The result is shown in Table 1.

Example 8

A polycarboxylic acid-based polymer (8) was obtained in the same manner as in Example 5 except that in Example 5, SN-DEFOAMER 1316 (manufactured by San Nopco Limited) was used instead of NEWCOL 3240.

The result is shown in Table 1.

Example 9

122.3 g of pure water, 157.8 g of 48% NaOH, 122.9 g of maleic anhydride, 186.1 g of 40% HAPS, and 0.04 g of SN-DEFOAMER 157 (manufactured by San Nopco Limited) were initially loaded into a cylindrical glass separable flask having an inner diameter of 8.5 cm and a height of 20 cm, the flask including a temperature gauge, a stirrer, and a reflux condenser, and the temperature of the pure water was increased under stirring so that the pure water was brought into a boiling point reflux state.

Next, under stirring, while the reflux state was maintained, 112.8 g of 80% AA was dropped over 120 minutes from the initiation of polymerization, 16.3 g of 35% $H_2O_2$ was dropped over 75 minutes from the initiation of the polymerization, 38.0 g of 15% NaPS was dropped over 130 minutes from the initiation of the polymerization, and 44.0 g of pure water was dropped over 55 minutes from a time 75 minutes after the initiation of the polymerization to a time 130 minutes thereafter; the materials were dropped from dropping nozzles different from one another continuously at uniform rates. Further, the polymerization was finished by maintaining the boiling point reflux state over 20 minutes after the completion of the dropping of all the materials. Thus, a polycarboxylic acid-based polymer (9) was obtained.

The result is shown in Table 1.

Example 10

122.3 g of pure water, 154.4 g of 48% NaOH, 122.9 g of maleic anhydride, 186.2 g of 40% HAPS, and 0.04 g of SN-DEFOAMER 1316 (manufactured by San Nopco Limited) were initially loaded into a cylindrical glass separable flask having an inner diameter of 8.5 cm and a height of 20 cm, the flask including a temperature gauge, a stirrer, and a reflux condenser, and the temperature of the pure water was increased under stirring so that the pure water was brought into a boiling point reflux state.

Next, under stirring, while the reflux state was maintained, 112.8 g of 80% AA was dropped over 120 minutes from the initiation of polymerization, and 57.0 g of 15% NaPS was dropped over 130 minutes from the initiation of the polymerization; the materials were dropped from dropping nozzles different from one another continuously at uniform rates. Further, the polymerization was finished by maintaining the boiling point reflux state over 20 minutes after the completion of the dropping of all the materials. Thus, a polycarboxylic acid-based polymer (10) was obtained.

The result is shown in Table 1.

Comparative Example 1

A polycarboxylic acid-based polymer (C1) was obtained in the same manner as in Example 1 except that in Example 1, PLURONIC L-64 was not used.

The result is shown in Table 1.

Comparative Example 2

A polycarboxylic acid-based polymer (C2) was obtained in the same manner as in Example 2 except that in Example 2, PLURONIC L-64 was not used.

The result is shown in Table 1.

Comparative Example 3

A polycarboxylic acid-based polymer (C3) was obtained in the same manner as in Example 3 except that in Example 3, PLURONIC L-64 was not used.

The result is shown in Table 1.

Comparative Example 4

A polycarboxylic acid-based polymer (C4) was obtained in the same manner as in Example 4 except that in Example 4, PLURONIC F-68 was not used.

The result is shown in Table 1.

Comparative Example 5

A polycarboxylic acid-based polymer (C5) was obtained in the same manner as in Example 5 except that in Example 5, NEWCOL 3240 was not used.

The result is shown in Table 1.

Comparative Example 6

A polycarboxylic acid-based polymer (C6) was obtained in the same manner as in Example 9 except that in Example 9, SN-DEFOAMER 157 was not used.

The result is shown in Table 1.

Comparative Example 7

A polycarboxylic acid-based polymer (C7) was obtained in the same manner as in Example 10 except that in Example 10, SN-DEFOAMER 1316 was not used.

The result is shown in Table 1.

TABLE 1

| Polycarboxylic acid-based polymer | | Polymer composition (mol %) | | | Defoaming agent | Initiator | Foaming evaluation |
|---|---|---|---|---|---|---|---|
| | | AA | MA | HAPS | | | |
| Example 1 | AA/HAPS copolymer | 80 | 0 | 20 | PLURONIC L-64 | NaPS/$H_2O_2$ | ○ |
| Comparative Example 1 | | | | | None | | x |
| Example 2 | AA/MA/HAPS copolymer | 42 | 42 | 16 | PLURONIC L-64 | | ○ |
| Comparative Example 2 | | | | | None | | x |
| Example 3 | | | | | PLURONIC L-64 | V-50 | ○ |
| Comparative Example 3 | | | | | None | | x |
| Example 4 | AA/MA/HAPS copolymer | 46 | 46 | 8 | PLURONIC F-68 | NaPS/$H_2O_2$ | ○ |
| Comparative Example 4 | | | | | None | | x |
| Example 5 | AA/MA/HAPS copolymer | 45 | 45 | 10 | NEWCOL 3240 | | ○ |
| Example 6 | | | | | NOPCO 8034 | | ○ |
| Example 7 | | | | | SN-DEFOAMER 313 | | ○ |
| Example 8 | | | | | SN-DEFOAMER 1316 | | ○ |
| Comparative Example 5 | | | | | None | | x |
| Example 9 | AA/MA/HAPS copolymer | 44 | 44 | 12 | SN-DEFOAMER 157 | | ○ |
| Comparative Example 6 | | | | | None | | x |
| Example 10 | | | | | SN-DEFOAMER 1316 | NaPS | ○ |
| Comparative Example 7 | | | | | None | | x |

INDUSTRIAL APPLICABILITY

An aqueous solution of the polycarboxylic acid-based polymer obtained by the production method of the present invention is particularly suitable for applications such as a scale inhibitor, a corrosion inhibitor, a water treatment agent, and a dispersant.

What is claimed is:

1. A method of producing a polycarboxylic acid-based polymer, comprising adding a monomer composition containing (meth)acrylic acid and/or salts thereof, a monomer composition containing maleic acid and/or salts thereof, a monomer composition containing (meth)acrylic acid and/or salts thereof and a sulfonic group-containing compound, a monomer composition containing maleic acid and/or salts thereof and a sulfonic group-containing compound, or a monomer composition containing (meth)acrylic acid and/or salts thereof, maleic acid and/or salts thereof and a sulfonic group-containing compound to a reaction vessel to perform a polymerization reaction,
  wherein the polycarboxylic acid-based polymer is a homopolymer of poly(meth)acrylic acid and/or salts thereof, a homopolymer of polymaleic acid and/or salts thereof, a copolymer of (meth)acrylic acid and/or salts thereof and a sulfonic group-containing compound, a copolymer of maleic acid and/or salts thereof and a sulfonic group-containing compound, or a copolymer of (meth)acrylic acid and/or salts thereof, maleic acid and/or salts thereof and a sulfonic group-containing compound,
  the method further comprising adding a defoaming agent by a time when 100 mass % of a total amount of the monomer composition is added.

2. The method of producing a polycarboxylic acid-based polymer according to claim 1, wherein an addition amount of the defoaming agent is from 1 ppm to 10,000 ppm with respect to the total amount of the monomer composition.

3. The method of producing a polycarboxylic acid-based polymer according to claim 1, wherein a total amount of the defoaming agent is initially loaded into the reaction vessel.

4. The method of producing a polycarboxylic acid-based polymer according to claim 1, wherein the defoaming agent comprises an oxyalkylene-based defoaming agent.

5. The method of producing a polycarboxylic acid-based polymer according to claim 1, wherein the polymerization reaction is performed by using hydrogen peroxide as a polymerization initiator.

6. The method of producing a polycarboxylic acid-based polymer according to claim 1, wherein the polycarboxylic acid-based polymer is a copolymer of (meth)acrylic acid and/or salts thereof and a sulfonic group-containing compound, or a copolymer of (meth)acrylic acid and/or salts thereof, maleic acid and/or salts thereof and a sulfonic group-containing compound.

7. The method of producing a polycarboxylic acid-based polymer according to claim 1, wherein a polymerization pressure for the polymerization reaction is under normal pressure.

8. The method of producing a polycarboxylic acid-based polymer according to claim 1, wherein a polymerization temperature for the polymerization reaction is 70° C. to a boiling point of the monomer composition.

* * * * *